(12) United States Patent
Rizun

(10) Patent No.: US 10,184,818 B2
(45) Date of Patent: Jan. 22, 2019

(54) DEVICE AND METHOD FOR DISPENSING PASTE-LIKE OR STICKY NUTRITIONAL SUBSTANCE

(71) Applicant: Nodari Rizun, San Diego, CA (US)

(72) Inventor: Nodari Rizun, San Diego, CA (US)

(*) Notice: Subject to any disclaimer, the term of this patent is extended or adjusted under 35 U.S.C. 154(b) by 50 days.

(21) Appl. No.: 15/442,539

(22) Filed: Feb. 24, 2017

(65) Prior Publication Data

US 2017/0167908 A1  Jun. 15, 2017

Related U.S. Application Data

(63) Continuation-in-part of application No. 14/939,731, filed on Nov. 12, 2015, now Pat. No. 9,903,747.

(Continued)

(51) Int. Cl.
*G01F 19/00* (2006.01)
*G01F 23/04* (2006.01)
(Continued)

(52) U.S. Cl.
CPC ............ *G01F 19/005* (2013.01); *A23L 1/015* (2013.01); *A23L 1/06* (2013.01); *A23L 1/08* (2013.01); *B01F 3/10* (2013.01); *B01F 15/00155* (2013.01); *A23V 2002/00* (2013.01); *B01F 2003/105* (2013.01)

(58) Field of Classification Search
CPC ........ G01G 19/52; G01G 19/54; G01G 19/56; G01G 21/22; G01G 19/41; G01G 23/20; G01G 23/206; G01F 19/005; G01F 19/00; G01F 23/04; A23L 1/06; A23L 1/08; A23L 1/015; B01F 3/10; B01F 15/00155; B01F 2003/105; A23V 2002/00; B05C 17/00
See application file for complete search history.

(56) References Cited

U.S. PATENT DOCUMENTS 34,943 A   4/1862  Chinnock
353,055 A  11/1886  Dorr
(Continued)

OTHER PUBLICATIONS

Coolthings, "Mugstir Lets You Have a Coffee Spoon Without Turning You Into a Pirate", (2010) retrieved from http://www.coolthings.com/mugstir-coffee-spoon/, on Nov. 9, 2015, in 2 pages.

*Primary Examiner* — Randy Gibson
(74) *Attorney, Agent, or Firm* — Procopio, Cory, Hargreaves & Savitch LLP; Lisel Maria Ferguson

(57) ABSTRACT

An elongate device for dispensing a measured quantity of a paste-like resinous nutritional substance for consumption, injection, or topical use has an integral, outwardly directed hook at a first end. In one case, the elongate device is curved along its length from the hook to a second end and has a concave front face and a convex rear face, with a metered end portion on the front face or on both faces extending from the second end and having one or more scale markings for indicating an amount of paste-like substance adhered to the end portion between a scale marking and the second end. The dispensing device may alternatively be used for dissolving a measured quantity of the material in a liquid by engaging the hook over the rim of a container to suspend the device into the container with the metered end portion submerged in liquid in the container.

11 Claims, 4 Drawing Sheets

Related U.S. Application Data

(60) Provisional application No. 62/308,169, filed on Mar. 14, 2016.

(51) Int. Cl.
    *B05C 17/00* (2006.01)
    *B01F 3/10* (2006.01)
    *B01F 15/00* (2006.01)
    *A23L 1/015* (2006.01)
    *A23L 1/06* (2006.01)
    *A23L 1/08* (2006.01)

(56) References Cited

U.S. PATENT DOCUMENTS

| | | | |
|---|---|---|---|
| 379,692 A | 3/1888 | Elliott | |
| 645,875 A | 3/1900 | Strauss et al. | |
| 1,000,178 A | 8/1911 | Kahl et al. | |
| 1,466,043 A | 8/1923 | Graham et al. | |
| 1,881,316 A | 10/1932 | Guido et al. | |
| 2,027,494 A | 1/1936 | Trabold et al. | |
| 2,169,952 A | 8/1939 | Holmes et al. | |
| 2,230,341 A * | 2/1941 | Szasz | G01G 1/26 177/131 |
| 2,314,387 A * | 3/1943 | Carlsson | G09B 19/0092 177/245 |
| D140,049 S | 1/1945 | Davis | |
| 2,597,275 A | 5/1952 | Ahlstrand et al. | |
| 2,607,122 A | 8/1952 | Overmyer et al. | |
| 2,628,742 A | 2/1953 | Vibe et al. | |
| 2,720,114 A | 10/1955 | Truffa et al. | |
| 2,802,266 A | 8/1957 | Huxhold et al. | |
| 2,984,064 A | 5/1961 | Russell et al. | |
| 3,006,314 A | 10/1961 | Malec et al. | |
| 3,745,659 A | 7/1973 | Hsu et al. | |
| 4,294,273 A | 10/1981 | Isberg et al. | |
| 4,387,777 A * | 6/1983 | Ash | G01G 19/40 177/1 |
| 4,433,597 A | 2/1984 | Rowland et al. | |
| 4,445,370 A | 5/1984 | Whitmire | |
| 4,531,293 A | 7/1985 | Grinde | |
| 4,550,602 A | 11/1985 | Burke et al. | |
| 5,044,453 A * | 9/1991 | Bankier | G01G 19/41 177/25.16 |
| 5,318,371 A | 6/1994 | Niewulis | |
| 5,319,162 A * | 6/1994 | Ness | G01G 3/00 116/DIG. 32 |
| 5,383,373 A | 1/1995 | Knowles et al. | |
| 5,416,279 A * | 5/1995 | Tseng | G01G 19/14 116/DIG. 32 |
| 5,438,886 A | 8/1995 | Knowles et al. | |
| 5,566,465 A | 10/1996 | Zoellner et al. | |
| 5,758,540 A | 6/1998 | Davila et al. | |
| 5,863,431 A | 1/1999 | Salzburg et al. | |
| 5,922,349 A | 7/1999 | Elliesen et al. | |
| 7,258,004 B2 | 8/2007 | Bensussan | |
| 7,263,893 B2 | 9/2007 | Kosmyna et al. | |
| 7,350,418 B2 | 4/2008 | Kosmyna et al. | |
| 8,256,130 B2 | 9/2012 | Jantz | |
| 9,273,991 B1 * | 3/2016 | Reece, III | A22B 5/0029 |
| 9,759,595 B1 | 9/2017 | Morgan | |
| 9,903,747 B2 * | 2/2018 | Rizun | A23L 1/06 |
| 2010/0089151 A1 | 4/2010 | Mantilla et al. | |
| 2013/0078337 A1 | 3/2013 | Elfstrum et al. | |
| 2016/0185582 A1 | 6/2016 | Crane | |
| 2017/0167908 A1 | 6/2017 | Rizun | |

* cited by examiner

DEVICE AND METHOD FOR DISPENSING PASTE-LIKE OR STICKY NUTRITIONAL SUBSTANCE

CROSS REFERENCE TO RELATED APPLICATIONS

This application claims the benefit of Provisional App. No. 62/308,169 filed on Mar. 14, 2016, and is a Continuation In Part of application Ser. No. 14/939,731 filed on Nov. 12, 2015, and the contents of each of the aforementioned applications are incorporated herein by reference in their entirety.

BACKGROUND

1. Field of the Invention

This invention relates generally to paste-like, sticky or resinous edible or nutritional substances, and is particularly concerned with a device and method for dispensing such substances.

2. Related Art

Many health substances or nutritional substances come in paste-like or thick, sticky liquid forms, for example mineral pitch resin, shilajit, mumie, nutritive jams, honeys and syrups, and the like. Resinous pastes are often preferred by users over liquids and powders because they are more natural and authentic (less processed) and are believed to have higher efficacy. However, resinous pastes often have less than favorable taste, smell and consistency, and are difficult to accurately measure and consume. Another problem with resinous pastes is that the pure material is quite expensive, so they are often counterfeited and mixed with fillers and bulking agents.

SUMMARY

According to one aspect, a device for dispensing a paste-like or sticky nutritional substance in roughly measured amounts for consumption or for dissolving in a liquid prior to consumption is provided, which comprises an elongate member having opposite first and second ends and an integral, rearwardly directed hook at the first end for optionally suspending the elongate member from the rim of a container such as a glass, cup, jar, bottle or the like into the interior of the container. In one aspect, the elongate member is arcuate or curved between the hook and the second end and has a rear convex face and a front concave face. Alternatively, it may be straight or of other shapes. In one aspect, a collection portion or metered end portion is provided on the front, concave face extending up to the second end and having a scale marking for indicating an amount of paste-like substance adhered to the metered end portion between the scale marking and second end. The same marking may be provided on an end portion of the rear face up to the second end.

The scale marking may comprise one or more lines imprinted or indented on the face of the member and spaced at a predetermined distance or distances from the second end along with a scale indicating approximate weights of substance adhered to the metered end portion from the second end up to the respective lines. The scale marking may alternatively comprise an indentation of predetermined dimensions.

According to another aspect, a method of dispensing a measured bolus or "pill" of paste-like, resinous nutritional substance for consumption is provided, which comprises holding a first end of an elongate, arcuate collecting and dispensing device having a front, concave face and a rear, convex face, dipping a second end of the device into a volume of resinous nutritional substance up to a selected scale line of a plurality of scale markings on a second end portion of the front or rear face of the device, and scooping out a roughly measured small mass or bolus of the resinous nutritional substance adhered to the second end portion of the device and extending between the selected scale line and second end of the device.

The small bolus or "pill" of resinous nutritional substance may be removed from the device and swallowed after collection. Alternatively, the metered end portion of the dispensing device carrying the roughly measured amount of resinous substance may be suspended into a quantity of liquid in a container with the hooked end of the device engaging over a rim of the container, so that the substance disperses and dissolves into the liquid, after which the dispersing device is removed from the container. The resultant solution may be ingested, injected, or inserted, or may be applied topically to the skin. Both faces of the second end portion of the device may have scale markings and an amount of resinous substance may be selectively collected on the front, concave face or the rear, convex face of the device as described above prior to suspending the device into a quantity of liquid.

If desired, the user may agitate the device in the liquid so that it dissolves more quickly. However, the substance dissolves on its own without the necessity of agitating the device. If a glass or transparent container is used, the user may also readily observe if any solid, non-soluble fillers or bulking agents are present in the paste-like substance, since such materials will typically sink to the bottom of the container as the paste dissolves or disperses. This allows the user to monitor quality or purity of the substance. If the resinous substance is pure, the user can then collect another measured amount onto the metered end portion of the front face to form a bolus or pill, and then ingest the bolus directly after removing it from the dispensing device if desired.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a dispensing device for dispensing a measured or roughly measured amount or bolus of a paste-like or sticky resinous nutritional material such as a mineral pitch resin paste, shilajit, mumie, or nutritive jams, honeys and syrups, and for dispensing methods using the device.

After reading this description it will become apparent to one skilled in the art how to implement the invention in various alternative embodiments and alternative applications. However, although various embodiments of the present invention will be described herein, it is understood that these embodiments are presented by way of example only, and not limitation.

Figure 4:
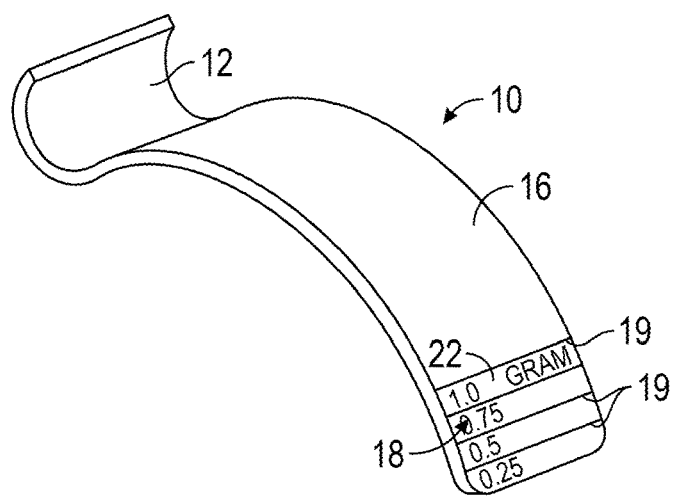
FIG. 4 is a rear perspective view of the device of FIGS. 1 to 3.
Figure 5:
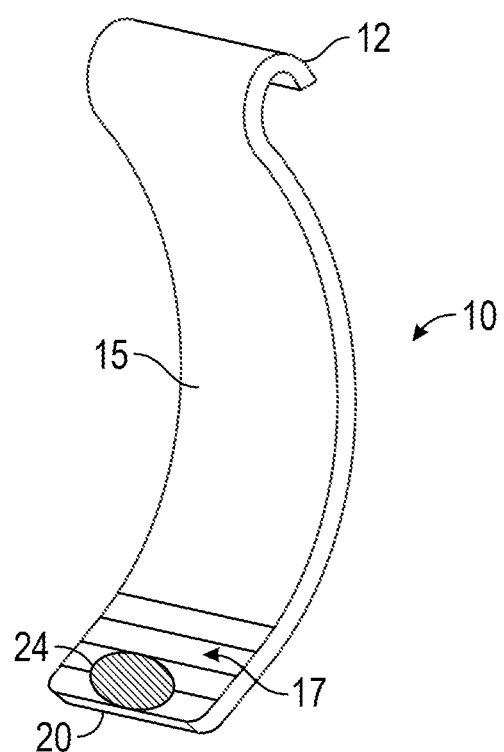
FIG. 5 is a front perspective view illustrating the device of FIGS. 1 to 4 with a quantity of resinous substance collected on the metered end portion of the device.
Figure 6:
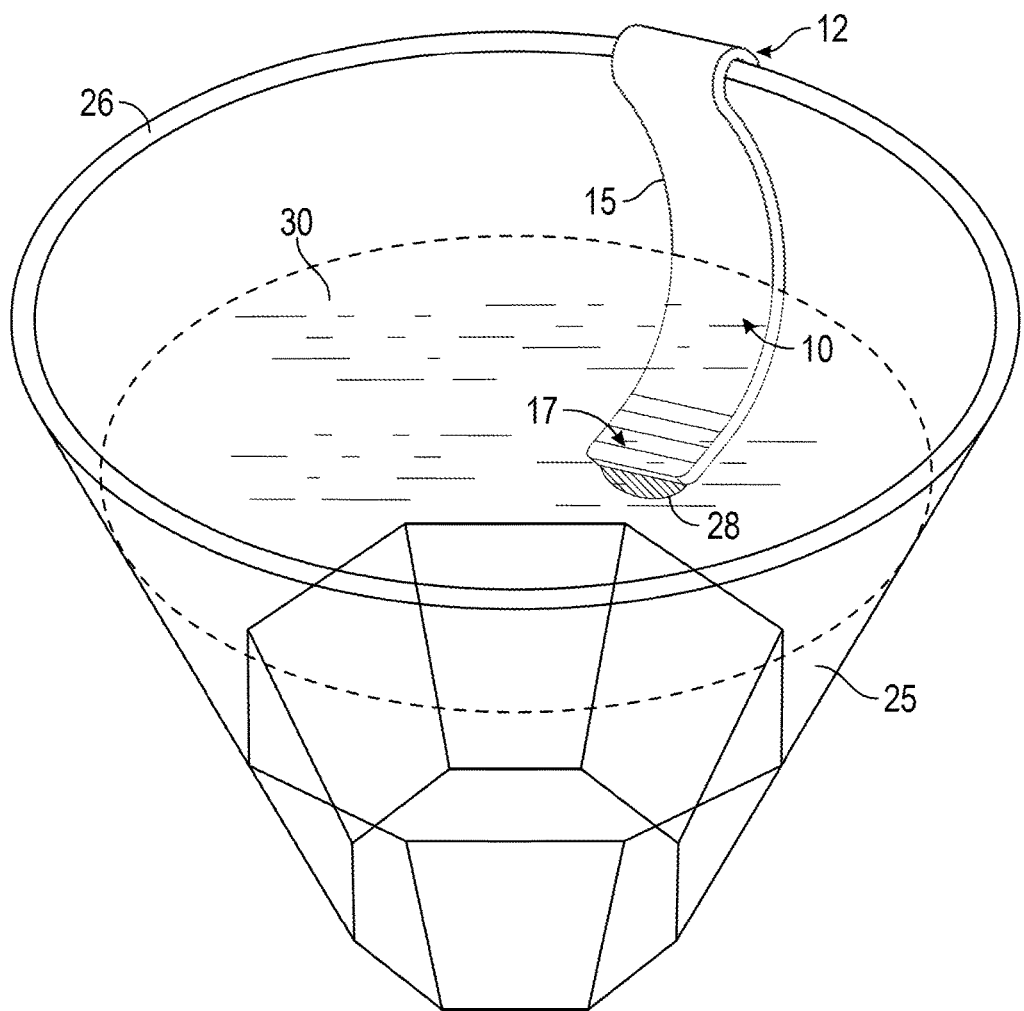
FIG. 6 is a perspective view illustrating the device of FIGS. 1 to 5 hooked over the rim of a glass so that the metered end portion carrying a bolus of resinous substance is suspended in a liquid in the glass.

FIGS. 1 to 5 illustrate one embodiment of a dispensing device 10 for dispensing a measured or roughly measured amount of paste-like substance or sticky material such as a resinous nutritional material for consumption, injection, topical application, or the like, while FIG. 6 illustrates a method of dissolving a roughly measured amount of the material from the device 10 into a quantity of liquid.

In one embodiment, device 10 comprises an elongate, strip-like member having opposite first and second ends and an integral, outwardly directed hook 12 at the first end for suspending the dispensing device from the rim 26 of a container such as a glass 25 as illustrated in FIG. 6, or alternatively a cup, jar, bottle or the like, with the device extending downward into the interior of the container. The hooked end may also act as a handle. The strip-like shape has a first curvature along a major part of its length from the second end 20, then reverses direction at a location close to the first end to form the hook 12 curving in the opposite direction, forming a generally S-like shape with the hooked end having a smaller radius of curvature than the remainder of the strip-like member. The strip may be made of a rigid or semi rigid material, and may be of generally curved or arcuate shape as illustrated, or may be of other shapes, for example as shown in co-pending application Ser. No. 14/939,731 referenced above.

Figure 1:
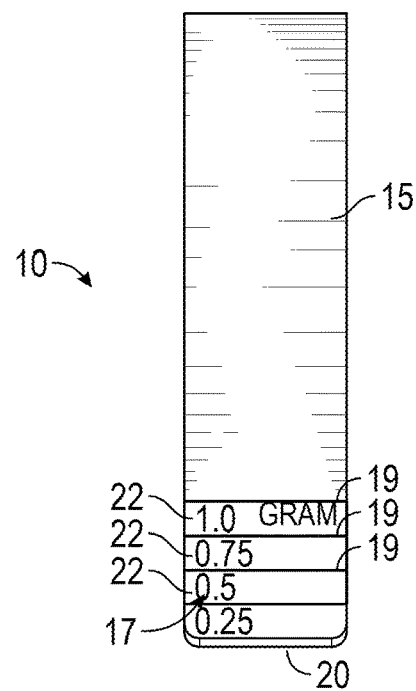
FIG. 1 is a front elevation view of a first embodiment of a device for dispensing a paste-like or resinous nutritional substance.
Figure 2:
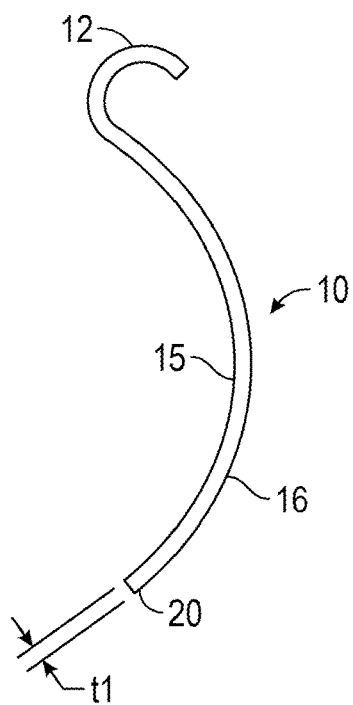
FIG. 2 is a side elevation view of the device of FIG. 1.
Figure 3:
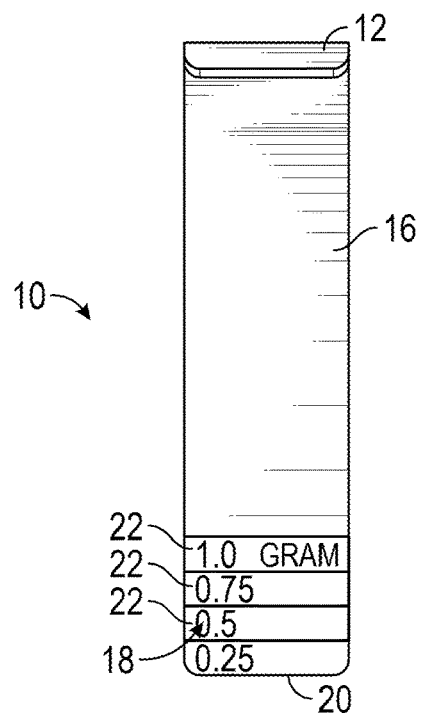
FIG. 3 is rear elevation view of the device of FIGS. 1 and 2.

In one embodiment, the elongate member has a front, concave face 15, a rear, convex face 16, and a metered end portion 17 on at least the front face 15 extending up to the second end 20, as illustrated in FIGS. 1 and 2. In this embodiment, both the front and rear faces have metered end portions 17, 18 with the same scale markings, as seen in FIGS. 1, 3 and 4. Each scale marking comprises a plurality of equally spaced lines 19 spaced at predetermined distances from the second end 20 for indicating an amount or weight of paste-like substance adhered to the metered end portion between a selected scale line 19 and second end 20. Indicia 22 may be provided to indicate the approximate amount of material adhered to the device if collected to the level of scale marking or line 19. In an alternative embodiment, the rear face may have no markings, with the scale marking at the metered end portion of front face 15 only. In some embodiments, scale lines 19 may extend across the entire width of the strip between the opposite sides, as in the illustrated embodiment. In other embodiments, the scale lines may extend over only part of the width of the strip.

The scale lines 19 and associate weight indicia 22 (in this case 0.25 grams, 0.5 grams, 0.75 grams, and 1.0 gram) are imprinted or etched on the front face and optionally also on the rear face. Lines 19 are spaced at predetermined distances from the second end to allow for collection and dispersing of different amounts of material, for example corresponding to roughly 0.25 grams, 0.5 grams, 0.75 grams, and 1.0 grams of material if collected on the device to the respective scale line, as illustrated in FIG. 5, where a quantity 24 of resinous material has been collected on the scooped, concave end portion of front face 15 up to the 0.5 gram line. The quantity of material may alternatively be collected on the metered convex end portion of the rear face if desired.

In one embodiment, the elongate member of FIGS. 1 to 4 is a strip of metal such as stainless steel or the like or other rigid or semi-rigid material such as food grade plastic material, bent to form the arcuate curvature seen in FIG. 2 and the oppositely directed hook or handle 12 at its first end. The scale markings and indicia may be provided on only the inner face or on both faces of the device, and may alternatively comprise an indentation of predetermined dimensions.

In an alternative embodiment, the curvature of the member may be different from that shown in the drawings. In other alternatives, the device may be straight, slightly curved, or may be of other non-straight shapes.

In one embodiment, the length L1 of device 10 from the upper bent end 12 of the hook to second end 20 was in the range from around one to two inches, and the width of the strip was around 0.5 inches. The height may be approximately four times the width of the strip in one example. The thickness t1 (see FIG. 2) of the metal or other material of the elongate member or strip in this example was around 0.05 inches. The distance between each adjacent pair of scale lines 19 and between the first, 0.25 gram scale line and the second end of the device was around ⅛ inch. The radius of curvature of the arcuate or curved portion may be around 1 inch.

The scooped or concave end shape of the device 10 allows it to be readily used to scoop a roughly measured quantity or bolus of resinous, paste-like nutritional substance from a container of the substance, while the first end hook acts as a handle for holding the device while scooping. The user can dip the second end 20 into the resin until it is submerged to the desired scale line 19, depending on the amount determined to be suitable for the user based on their body weight. Once the scale line reaches the top surface of the material, the user can scoop out a blob or bolus 24 of the material which is a somewhat sticky substance which tends to stick to the surface of device 10 (see FIG. 5). The user can then remove the bolus from the device and swallow it, washing it down with any desired drink. In FIG. 5, the bolus 24 is scooped out on the end portion of concave face 15 of the device. However, a bolus may also be retrieved on the end portion 18 of convex face 16 if desired.

Alternatively, a user may prefer to dissolve the adhered bolus of material in a liquid before consumption, as generally illustrated in FIG. 6. In the latter case, the material may be adhered to the end portion of either the concave or convex face of device 10. In FIG. 6, a bolus 28 of resin material has been adhered to end portion 18 of rear or convex face 16 up to the desired scale line from the second end 20. The hook 12 is then engaged over rim 26 so that part of the device including the metered end portion 18 is suspended in a liquid 30 contained in glass 25. The same technique may be used for suspending the device into other types of liquid containers, such as cups, bottles, bowls, glasses, and the like. The user can then wait for the substance to disperse and dissolve into the liquid before removing the dispensing device from the container and using the resultant solution. The mixture of dissolved substance and liquid may be ingested, injected, inserted, or may be applied topically to the skin, depending on the nature and purpose of the substance. If desired, the user may agitate the device 10 in the liquid so that the metered quantity 28 of paste-like material dissolves more quickly, although this is not necessary since the material will dissolve into the liquid with the device left in place in the position illustrated in FIG. 6. The user can also readily observe if any solid, non-soluble fillers or bulking agents are present in the paste-like substance, since such materials will typically sink to the bottom of the container as the paste dissolves or disperses. This allows the user to monitor quality or purity of the substance. The user may see this happening as the material disperses if a glass or transparent container along with a colorless or translucent liquid is used. Alternatively, once the material is all dispersed, the mixture can be poured carefully from the container to reveal any solid contaminants in the bottom of the glass or other container.

The device described above may be used for collecting and dispensing measured or roughly measured amounts of many health or nutritional substances which come in pastes or thick, sticky forms, and may also be used for dissolving such substances in a liquid if desired. Alternatively, a measured bolus or "pill" may be removed directly from the device after collection and consumed. Such pastes or sticky substances include, for example, mineral pitch resin, shilajit, mumie, nutritive jams, honeys and syrups, and the like. Resinous pastes such as mineral pitch resin are popular but often have less than favorable taste, smell and consistency, and are difficult to accurately measure and consume. By collecting a measured amount onto the device 10 as described above, the measured quantity or bolus of the substance may be swallowed like a pill, avoiding tasting the substance.

Another problem with resinous pastes is that the pure material is quite expensive, so they are often counterfeited and mixed with fillers and bulking agents, and may then be sold as pills. The dispensing device described above allows nutritional resins sold in bulk amounts to be formed into rough pills to provide the advantages of pre-formed pills in reducing the effect of bad taste or smell of the raw resin material. The device also allows the resin material to be tested prior to consumption as a "pill" by dissolving some of the material in a liquid as described above. Once it is determined that the material does not contain insoluble fillers or bulking agents, it may be consumed in a pill-like form or dissolved in a liquid for consumption, as desired by the consumer.

In some embodiments, a dispensing device 10 may be supplied as an accessory with each container of a paste like or sticky substance to be dispersed or dissolved in a liquid.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

I claim:

1. A device for dispensing a paste-like or sticky substance for consumption, comprising:
   an elongate member having a front face, a rear face, opposite sides, and opposite first and second ends;
   a rearwardly directed hook at the first end of the member;
   the elongate member having a curved metered collection portion on at least one of the front and rear face extending up to the second end and configured for collection of an amount of paste-like substance adhered to the collection portion prior to dispensing of the collected amount; and
   the metered collection portion comprising one or more scale markings at least on the front face for indicating an amount of paste-like substance adhered to the metered collection portion, wherein the metered collection portion is sized and dimensioned to be dipped into a volume of the paste-like or sticky substance up to a selected scale marking of the one or more scale markings, and wherein the elongate member has a generally S-like shape with the hooked end having a smaller radius of curvature than the remainder of the elongate member.

2. The device of claim 1, wherein the front face is concave and the rear face is convex.

3. The device of claim 2, wherein the device is formed from a strip of material bent at the first end to form the hook curved in a first direction and curved in an opposite direction from the hook to the second end to form the concave front face and convex rear face.

4. The device of claim 1, wherein the scale markings comprise at least one line extending across the width of said elongate member.

5. The device of claim 4, wherein the scale markings comprise a plurality of lines extending across the width of said elongate member and spaced at different distances from the second end.

6. The device of claim 5, wherein a spacing between a first line and the second end of the elongate member is equal to the spacing between adjacent pairs of lines.

7. The device of claim 5, wherein a second metered collection portion is provided on the convex rear face of the elongate member.

8. A device for dispensing a paste-like or sticky substance for consumption, comprising:
   an elongate member having a front face, a rear face, opposite sides, and opposite first and second ends;
   a rearwardly directed hook at the first end of the member;
   the elongate member having a metered collection portion on at least one of the front and rear face extending from the second end and configured for collection of an amount of paste-like substance adhered to the collection portion prior to dispensing of the collected amount; and
   the metered collection portion comprising one or more scale markings at least on the front face and spaced a predetermined distance from the second end for indicating an amount of paste-like substance adhered to the collection portion between the scale marking and second end;
   wherein the scale markings comprise at least one line extending across the width of said elongate member, wherein the scale markings comprise a plurality of lines extending across the width of said elongate member and spaced at different distances from the second end; and
   wherein the scale markings further comprise indicia corresponding to an approximate weight imprinted adjacent each line.

9. A device for dispensing a paste-like or sticky substance for consumption, comprising:
   an elongate member having a front face, a rear face, opposite sides, and opposite first and second ends;
   a rearwardly directed hook at the first end of the member, the elongate member having a metered collection portion on at least one of the front and rear face extending from the second end and configured for collection of an amount of paste-like substance adhered to the collection portion prior to dispensing of the collected amount; and the metered collection portion comprising one or more scale markings at least on the front face and spaced a predetermined distance from the second end for indicating an amount of paste-like substance adhered to the collection portion between the scale marking and second end;

wherein the scale markings comprise at least one line extending across the width of said elongate member, wherein the scale markings comprise a plurality of lines extending across the width of said elongate member and spaced at different distances from the second end; and wherein there are four equally spaced lines extending across at least part of the width of the strip and corresponding to approximate weights of 0.25, 0.5, 0.75, and 1.0 gram, respectively.

10. The device of claim 9, wherein the spacing between each adjacent pair of lines is approximately ⅛ inch.

11. The device of claim 1, wherein the length of the elongate member from the hook to the second end is in the range from approximately one inch to approximately two inches.

* * * * *